(12) United States Patent
Bivolarsky et al.

(10) Patent No.: US 11,525,809 B2
(45) Date of Patent: Dec. 13, 2022

(54) APPARATUS, SYSTEM, AND METHOD FOR THE DETECTION OF OBJECTS AND ACTIVITY WITHIN A CONTAINER

(71) Applicant: PERCEPTIVE SENSOR TECHNOLOGIES, INC., Tucson, AZ (US)

(72) Inventors: Lazar Bivolarsky, Cupertino, CA (US); Joel D. Burcham, Huntsville, AL (US); Earl Crochet, Humble, TX (US); James M. Heim, Tucson, AZ (US); William Coleman, Tucson, AZ (US)

(73) Assignee: PERCEPTIVE SENSOR TECHNOLOGIES, INC., Tucson, AZ (US)

( * ) Notice: Subject to any disclaimer, the term of this patent is extended or adjusted under 35 U.S.C. 154(b) by 0 days.

(21) Appl. No.: 17/542,465

(22) Filed: Dec. 5, 2021

(65) Prior Publication Data

US 2022/0178880 A1     Jun. 9, 2022

Related U.S. Application Data

(60) Provisional application No. 63/122,336, filed on Dec. 7, 2020, provisional application No. 63/121,720, filed on Dec. 4, 2020.

(51) Int. Cl.
  *G01N 29/032*     (2006.01)
  *G01N 29/22*      (2006.01)

(52) U.S. Cl.
  CPC ......... *G01N 29/032* (2013.01); *G01N 29/222* (2013.01); *G01N 29/223* (2013.01); *G01N 2291/044* (2013.01); *G01N 2291/10* (2013.01)

(58) Field of Classification Search
  CPC .. G01N 29/032; G01N 29/222; G01N 29/223; G01N 29/02; G01N 29/14;
  (Continued)

(56) References Cited

U.S. PATENT DOCUMENTS

| 2,449,054 A | 9/1948 | Chantlin | 177/311 |
| 3,019,650 A | 2/1962 | Worswick | 73/290 |

(Continued)

FOREIGN PATENT DOCUMENTS

| CN | 105548370 | 5/2016 | ............. G01N 29/24 |
| DE | 10 2010 029 254 | 12/2011 | ............... F01N 3/10 |

(Continued)

OTHER PUBLICATIONS

Amjad, Umar et al, "Advanced signal processing technique for damage detection in steel tubes" Proceedings of SPIE, Health Monitoring of Structural and Biological Systems 2016, 980511 (Apr. 1, 2016); 14 pgs.

(Continued)

*Primary Examiner* — Tarun Sinha
(74) *Attorney, Agent, or Firm* — Hayes Soloway P.C.

(57) ABSTRACT

An apparatus, system, and method for the detection of contents within a container includes a plurality of transducers mounted on an exterior surface of the container. A plurality of acoustic signals is transmitted into the container, and an echo is generated when the signals contact an object. The echo is received at a transducer and a processor analyzes the echo to detect the object. Similarly, two acoustic transducers can be used to angularly transmit the signal into a container. The signal reflects off a sediment surface and is received at another acoustic transducer. The reflection signal can be used to analyze a sediment surface within the container.

20 Claims, 6 Drawing Sheets

(58) Field of Classification Search
CPC .......... G01N 29/024; G01N 29/07; G01N 2291/044; G01N 2291/10
See application file for complete search history.

(56) References Cited

U.S. PATENT DOCUMENTS

| | | | |
|---|---|---|---|
| 3,703,829 A | 11/1972 | Dougherty | 73/290 |
| 3,837,218 A | 9/1974 | Flambard et al. | G01N 29/00 |
| 3,971,962 A | 7/1976 | Green | H01L 41/08 |
| 4,065,958 A | 1/1978 | Krylova et al. | G01N 29/02 |
| 4,118,983 A | 10/1978 | Braznikov | G01F 23/28 |
| 4,121,468 A * | 10/1978 | Glover | G01S 15/8977 |
| | | | 73/622 |
| 4,182,177 A | 1/1980 | Prough | 73/290 |
| 4,280,126 A | 7/1981 | White | 340/621 |
| 4,320,659 A * | 3/1982 | Lynnworth | G01H 15/00 |
| | | | 73/290 V |
| 4,501,146 A * | 2/1985 | Greenhalgh | G01F 23/2962 |
| | | | 73/DIG. 1 |
| 4,580,448 A | 4/1986 | Skrgatic | G01F 23/28 |
| 4,596,266 A | 6/1986 | Kinghorn et al. | B65D 88/38 |
| 4,676,098 A | 6/1987 | Erlenkämper et al. | 73/290 |
| 4,852,416 A | 8/1989 | Boone et al. | H04R 1/02 |
| 4,934,191 A | 6/1990 | Kroening et al. | 73/592 |
| 4,954,997 A | 9/1990 | Dieulesaint et al. | G08B 21/00 |
| 4,977,780 A | 12/1990 | Machida et al. | G01N 29/04 |
| 5,015,995 A | 5/1991 | Holroyd | 340/621 |
| 5,038,611 A | 8/1991 | Weldon et al. | 73/290 |
| 5,148,700 A | 9/1992 | King | G01N 15/00 |
| 5,195,058 A | 3/1993 | Simon | G01S 15/02 |
| 5,295,120 A | 3/1994 | McShane | 367/188 |
| 5,325,727 A | 7/1994 | Miller et al. | G01F 1/34 |
| 5,415,033 A | 5/1995 | Maresca, Jr. et al. | 73/40.5 |
| 5,438,868 A | 8/1995 | Holden et al. | 73/290 |
| 5,460,046 A | 10/1995 | Maltby et al. | G01N 29/24 |
| 5,469,749 A | 11/1995 | Shimada et al. | G01F 1/38 |
| 5,604,314 A | 2/1997 | Grahn | G01L 5/16 |
| 5,770,806 A | 6/1998 | Hiismaki | G01F 1/662 |
| 5,821,427 A * | 10/1998 | Byrd | G01F 1/002 |
| | | | 73/861.25 |
| 6,035,903 A | 3/2000 | Few et al. | B65B 1/04 |
| 6,151,956 A | 11/2000 | Takahashi et al. | G01N 3/56 |
| 6,157,894 A | 12/2000 | Hess et al. | 702/54 |
| 6,192,751 B1 | 2/2001 | Stein et al. | G08B 21/00 |
| 6,330,831 B1 | 12/2001 | Lynnworth et al. | 73/861.28 |
| 6,368,281 B1 | 4/2002 | Solomon et al. | A61B 8/14 |
| 6,443,006 B1 | 9/2002 | Degrave | G02F 23/00 |
| 6,470,744 B1 | 10/2002 | Usui et al. | 73/290 |
| 6,481,287 B1 | 11/2002 | Ashworth et al. | G01K 11/24 |
| 6,513,385 B1 | 2/2003 | Han | G01N 29/00 |
| 6,575,043 B1 | 6/2003 | Huang et al. | G01F 1/66 |
| 6,578,424 B1 | 6/2003 | Ziola et al. | G01N 29/00 |
| 6,631,639 B1 | 10/2003 | Dam et al. | 73/290 |
| 6,672,163 B2 | 1/2004 | Han et al. | G01V 1/28 |
| 6,925,868 B2 | 8/2005 | Young et al. | 73/290 |
| 6,938,488 B2 | 9/2005 | Diaz et al. | 73/597 |
| 7,085,391 B1 | 8/2006 | Yamaya | G10H 1/00 |
| 7,114,375 B2 | 10/2006 | Panetta et al. | 73/61.75 |
| 7,246,522 B1 | 7/2007 | Diaz et al. | 73/597 |
| 7,299,136 B2 | 11/2007 | DiFoggio et al. | 702/22 |
| 7,330,797 B2 | 2/2008 | Bailey et al. | G01F 23/00 |
| 7,363,174 B2 | 4/2008 | Kishiro et al. | G01F 25/10 |
| 7,624,650 B2 | 12/2009 | Gysling et al. | G01F 1/66 |
| 7,624,651 B2 | 12/2009 | Fernald et al. | G01F 1/66 |
| 7,656,747 B2 | 2/2010 | Mandal et al. | G01V 1/44 |
| 7,694,570 B1 | 4/2010 | Dam et al. | 73/644 |
| 7,962,293 B2 | 6/2011 | Gysling | G01F 1/76 |
| 7,966,882 B2 | 6/2011 | Greenwood | 73/597 |
| 8,683,882 B2 | 4/2014 | Jackson | G01N 9/24 |
| 8,820,182 B2 | 9/2014 | Nikolay Nikolov et al. | H04Q 9/00 |
| 8,850,882 B2 | 10/2014 | Qu et al. | G01F 23/296 |
| 8,915,145 B1 | 12/2014 | Van Orsdol | G01F 1/74 |
| 9,057,677 B2 | 6/2015 | Field | G01N 29/032 |
| 9,557,208 B2 | 1/2017 | Kuroda et al. | G01F 23/28 |
| 9,891,085 B2 | 2/2018 | Muhammad et al. | G01F 1/88 |
| 10,122,051 B2 | 11/2018 | Kuhne et al. | H01M 10/484 |
| 10,458,871 B2 | 10/2019 | Norli | G01L 11/04 |
| 10,794,871 B1 | 10/2020 | Blackshire et al. | G01N 29/265 |
| 11,020,793 B2 | 6/2021 | De Monte et al. | B22D 2/006 |
| 2002/0170753 A1 | 11/2002 | Clare | G01G 19/22 |
| 2004/0079150 A1 | 4/2004 | Breed et al. | 73/291 |
| 2004/0173021 A1 | 9/2004 | Lizon et al. | 73/290 |
| 2004/0226615 A1 | 11/2004 | Morikawa et al. | G05D 7/06 |
| 2005/0055136 A1 | 3/2005 | Hofmann et al. | 700/273 |
| 2005/0128873 A1 | 6/2005 | LaBry | G01V 1/40 |
| 2005/0178198 A1 | 8/2005 | Freger et al. | 73/290 |
| 2005/0247070 A1 | 11/2005 | Arshansky et al. | 62/77 |
| 2006/0196224 A1 | 9/2006 | Esslinger | 62/509 |
| 2007/0068253 A1 | 3/2007 | Carodiskey | A61B 6/00 |
| 2007/0157737 A1 | 7/2007 | Gysling et al. | G01F 1/667 |
| 2007/0205907 A1 | 9/2007 | Schenk, Jr. | G08B 21/00 |
| 2008/0092623 A1 * | 4/2008 | Lynch | G01N 29/02 |
| | | | 73/1.82 |
| 2009/0143681 A1 | 6/2009 | Jurvelin et al. | A61B 8/00 |
| 2010/0111133 A1 | 5/2010 | Yuhas et al. | G01K 17/00 |
| 2010/0199779 A1 | 8/2010 | Liu et al. | G01F 1/663 |
| 2010/0242593 A1 | 9/2010 | Lagergren et al. | G01F 23/296 |
| 2011/0029262 A1 | 2/2011 | Barkhouse | 702/55 |
| 2011/0072904 A1 | 3/2011 | Lam et al. | G01N 29/04 |
| 2011/0120218 A1 | 5/2011 | Aldridge | 73/290 |
| 2011/0239769 A1 | 10/2011 | Schmitt et al. | G01N 29/02 |
| 2011/0271769 A1 | 11/2011 | Kippersund et al. | G01F 1/66 |
| 2011/0284288 A1 | 11/2011 | Sawyer et al. | E21B 49/005 |
| 2012/0024067 A1 | 2/2012 | Oberdoerfer et al. | G01N 29/00 |
| 2012/0055239 A1 | 3/2012 | Sinha | G01N 29/00 |
| 2012/0259560 A1 | 10/2012 | Woltring et al. | 702/55 |
| 2012/0262472 A1 | 10/2012 | Garr et al. | G06T 11/206 |
| 2012/0281096 A1 * | 11/2012 | Gellaboina | G01S 15/88 |
| | | | 342/179 |
| 2013/0002443 A1 | 1/2013 | Breed et al. | G08B 21/00 |
| 2013/0068027 A1 | 3/2013 | Sullivan et al. | G01N 29/04 |
| 2013/0080081 A1 | 3/2013 | Dugger et al. | G01F 1/663 |
| 2013/0090575 A1 | 4/2013 | Rupp et al. | A61N 7/00 |
| 2013/0120155 A1 | 5/2013 | Hagg | G08C 19/16 |
| 2013/0128035 A1 | 5/2013 | Johns et al. | 348/135 |
| 2013/0213714 A1 | 8/2013 | Fuida | E21B 49/00 |
| 2014/0020478 A1 | 1/2014 | Ao et al. | G01F 1/66 |
| 2014/0027455 A1 | 1/2014 | Castellano et al. | B65D 88/34 |
| 2014/0076415 A1 | 3/2014 | Dunki-Jacobs et al. | E03C 1/02 |
| 2014/0107435 A1 | 4/2014 | Sharf et al. | A61B 8/00 |
| 2014/0223992 A1 | 8/2014 | Harper et al. | G01F 25/0084 |
| 2014/0301902 A1 | 10/2014 | Fernald et al. | B01J 19/10 |
| 2014/0375169 A1 | 12/2014 | Na et al. | H01L 41/08 |
| 2015/0075278 A1 | 3/2015 | Dockendorff et al. | G01F 23/296 |
| 2015/0212045 A1 | 7/2015 | Raykhman et al. | G01F 1/74 |
| 2015/0247751 A1 * | 9/2015 | Kutlik | G01F 23/2961 |
| | | | 73/290 R |
| 2015/0260003 A1 | 9/2015 | McHugh et al. | E21B 33/076 |
| 2015/0276463 A1 | 10/2015 | Milne et al. | G01F 23/296 |
| 2015/0369647 A1 | 12/2015 | Kumar et al. | G01F 23/284 |
| 2016/0025545 A1 | 1/2016 | Saltzgiver et al. | G01F 23/263 |
| 2016/0041024 A1 | 2/2016 | Reimer et al. | G01F 23/296 |
| 2016/0108730 A1 | 4/2016 | Fanini et al. | E21B 49/08 |
| 2016/0146653 A1 | 5/2016 | Skelding | E21B 21/01 |
| 2016/0169839 A1 | 6/2016 | Gottlieb et al. | G01N 29/22 |
| 2016/0216141 A1 | 7/2016 | Leaders et al. | G01F 1/66 |
| 2016/0320226 A1 | 11/2016 | Schaefer et al. | G01F 23/296 |
| 2017/0002954 A1 | 1/2017 | Brown et al. | F16K 37/0058 |
| 2017/0010144 A1 | 1/2017 | Lenner et al. | G01F 23/296 |
| 2017/0010145 A1 | 1/2017 | Lenner et al. | G01F 23/2962 |
| 2017/0010146 A1 | 1/2017 | Kassubek et al. | G01F 23/296 |
| 2017/0059389 A1 | 3/2017 | Moore et al. | G01F 23/2968 |
| 2017/0082650 A1 | 3/2017 | Hies et al. | G01F 25/0007 |
| 2017/0087526 A1 | 3/2017 | Luharuka | B01F 15/00 |
| 2017/0102095 A1 | 4/2017 | Kunita et al. | F16K 37/0091 |
| 2017/0097322 A1 | 6/2017 | Giese et al. | G01N 29/07 |
| 2017/0199295 A1 | 7/2017 | Mandal | G01V 1/50 |
| 2017/0202595 A1 | 7/2017 | Shelton, IV | A61B 18/00 |
| 2017/0239741 A1 | 8/2017 | Furuta | B23H 1/10 |
| 2017/0268915 A1 | 9/2017 | Gestner et al. | G01F 1/66 |
| 2017/0309989 A1 | 10/2017 | Waelde et al. | H01Q 1/225 |
| 2018/0035603 A1 | 2/2018 | Kremmer et al. | A01C 7/20 |

(56) References Cited

U.S. PATENT DOCUMENTS

| | | | |
|---|---|---|---|
| 2018/0044159 A1 | 2/2018 | Crouse et al. | B67D 1/0406 |
| 2018/0080809 A1 | 3/2018 | Tokarev et al. | G01F 23/2965 |
| 2018/0149505 A1 | 5/2018 | Ploss et al. | G01F 1/66 |
| 2018/0266874 A1 | 9/2018 | Montoya et al. | G01F 23/68 |
| 2018/0299317 A1 | 10/2018 | Truong et al. | G01F 23/2925 |
| 2018/0306628 A1 | 10/2018 | Parrott et al. | G01F 17/00 |
| 2018/0348169 A1 | 12/2018 | Lee et al. | G01N 29/11 |
| 2019/0011304 A1 | 1/2019 | Cunningham et al. | G01F 17/00 |
| 2019/0063984 A1 | 2/2019 | Bowley | G01F 23/2962 |
| 2019/0078927 A1 | 3/2019 | Takayama et al. | G01F 23/2965 |
| 2019/0137310 A1 | 5/2019 | Xiao et al. | G01F 1/06 |
| 2019/0195629 A1 | 6/2019 | Vaissiere | G01C 9/00 |
| 2019/0195830 A1 | 6/2019 | Tamura et al. | G01N 29/07 |
| 2019/0272496 A1 | 9/2019 | Moeller | G06Q 10/087 |
| 2020/0018628 A1 | 1/2020 | Head et al. | G21C 17/022 |
| 2020/0182736 A1 | 6/2020 | Kim et al. | G01M 3/2807 |
| 2020/0378283 A1 | 12/2020 | Zhang et al. | F01M 11/10 |
| 2020/0378812 A1 | 12/2020 | Heim | G01F 1/667 |
| 2020/0378818 A1 | 12/2020 | Heim et al. | G01F 23/296 |
| 2021/0382014 A1 | 12/2021 | Xu et al. | G01N 29/24 |
| 2022/0178879 A1 | 6/2022 | Bivolarsky et al. | G02N 29/028 |
| 2022/0178881 A1 | 6/2022 | Bivolarsky et al. | G01N 29/04 |

FOREIGN PATENT DOCUMENTS

| | | | |
|---|---|---|---|
| EP | 2450701 | 5/2012 | G01N 29/22 |
| EP | 2962096 | 8/2019 | G01L 1/255 |
| GB | 2192717 | 1/1990 | G01N 29/00 |
| KR | 200174618 | 3/2000 | G01N 29/24 |
| SU | WO 87/04793 | 8/1987 | G01N 29/00 |
| WO | WO 8809895 | 12/1988 | F16K 37/00 |
| WO | WO 2007/149605 | 12/2007 | |
| WO | WO 2014/167471 | 10/2014 | G01F 23/30 |
| WO | WO 2020/136945 | 7/2020 | G01F 23/296 |

OTHER PUBLICATIONS

Amjad, Umar et al. "Change in time-to-time flight of longitudinal (axisymmetric) wave modes due to lamination in steel pipes" Proceedings of SPIE vol. 8695, Health Monitoring of Structural and Biological Systems 2013, 869515 (Apr. 17, 2013); 10 pgs.

Amjad, Umar et al., "Effects of transducers on guided wave based structural health monitoring" Proceedings of SPIE, vol. 10600, Health Monitoring of Structural and Biological Systems XII, 106000F (Apr. 23, 2018),10 pgs.

Amjad, U. et al., "Generalized representations and universal aspects of Lamb wave dispersion relations" Proceedings of SPIE, vol. 7650, Health Monitoring of Structural and Biological Systems 2010, 76502F (Apr. 8, 2010), 9 pgs.

Amjad, Umar et al., "Detection and quantification of pipe damage from change in time of flight and phase" Ultrasoncis vol. 62 (2015) pp. 223-236, Jun. 11, 2015, 14 pgs.

Amjad, Umar et al., "Detection and quantification of diameter reduction due to corrosion in reinforcing steel bars" Structural Health Monitoring 2015, vol. 14(5) 532-543, 12 pgs.

Amjad, Umar et al., "Detection and quantification of delamination in laminated plates from the phase of appropriate guided wave modes" Optical Engineering 55(1), Jan. 2016, 11 pgs.

API: American Petroleum Institute Preliminary Program, Oct. 16-17, 2019, 5 pages.

Gurkov, Andrey "Gigantic Druzhba oil pipeline paralyzed for weeks" May 7, 2019, 3 pages, https://www.dw.com/en/gigantic-druzhba-oil-pipeline-paralyzed-for-weeks/a-48638989.

Hassanzadeh et al., "Investigation of factors affecting on viscosity reduction of sludge from Iranian crude oil storage tanks", Petroleum Science, vol. 15, Jul. 2018, pp. 634-643.

Kak et al., "Principles of Computerized Tomographic Imaging", IEEE, 1988, Chapter 2, 48 pgs.

Luck, Marissa "Deer Park fire a 'blemish' for the petrochemical industry's image" Houston Chronicle, Mar. 26, 2019, 3 pages https://www.houstonchronicle.com/business/energy/article/Deer-Park-fire-a-blemish-for-the-image-of-13717661.php.

Pandey, "Ultrasonic attenuation in condensed matter", Dissertation for V.B.S. Purvanchal University, 2009, Chapter 1, 36 pgs.

Pluta et al., "Stress Dependent Dispersion Relations of Acoustic Waves Travelling on a Chain of Point Masses Connected by Anharmonic Linear and Torsional Springs" International Congress on Ultrasonics AIP Conf. Proc. 1433, 471-474 (2012); 5 pgs.

Shelke, et al., "Mode-Selective Excitation and Detection of Ultrasonic Guided Waves for Delamination in Laminated Aluminum Plates" IEEE Transactions on Ultrasonics, Ferroelectrics, and Frequency Control, vol. 58, No. 3, Mar. 2011, 11 pgs.

"TOPS Terminal Operating Practices Symposium" Program Agenda, Apr. 11, 2018, 1 page.

Zadler, et al., "Resonant Ultrasound Spectroscopy: theory and application", Geophysical Journal International, vol. 156, Issue 1, Jan. 2004, pp. 154-169.

Examination Report No. 1 issued in Australian Application No. 2020283140 dated Jan. 4, 2022, 6 pgs.

Examination Report No. 1 issued in Australian Patent Application No. 2020302919, dated Feb. 15, 2022, 4 pgs.

International Search Report and Written Opinion issued in PCT/US20/35404, dated Aug. 24, 2020, 11 pages.

International Search Report and Written Opinion issued in PCT/US20/39966, dated Sep. 18, 2020, 13 pages.

International Preliminary Report on Patentability issued in PCT/US20/35404 dated Nov. 16, 2021, 8 pgs.

International Preliminary Report on Patentability issued in PCT/US20/39966 dated Dec. 28, 2021, 10 pgs.

Notice of Allowance issued in U.S. Appl. No. 16/888,469, dated Dec. 23, 2020, 16 pgs.

Notice of Allowance issued in U.S. Appl. No. 17/148,122 dated Jun. 16, 2021, 8 pgs.

Notice of Allowance issued in U.S. Appl. No. 16/914,092 dated Oct. 28, 2021, 14 pgs.

Office Action issued in Canadian Patent Application No. 3,140,008, dated Feb. 14, 2022, 4 pgs.

Office Action issued in U.S. Appl. No. 16/888,469, dated Aug. 5, 2020, 8 pages.

Office Action issued in U.S. Appl. No. 16/888,469, dated Sep. 8, 2020, 20 pages.

Office Action issued in U.S. Appl. No. 16/914,092, dated Nov. 10, 2020, 22 pgs.

Office Action issued in U.S. Appl. No. 16/914,092, dated Mar. 1, 2021, 25 pgs.

Office Action issued in U.S. Appl. No. 16/914,092, dated Jun. 24, 2021, 24 pgs.

Office Action issued in U.S. Appl. No. 17/148,122, dated Mar. 2, 2021, 26 pgs.

International Search Report and Written Opinion issued in PCT/US21/61962 dated Feb. 16, 2022, 9 pgs.

International Search Report and Written Opinion issued in PCT/US21/61924 dated Feb. 16, 2022, 9 pgs.

International Search Report and Written Opinion issued in PCT/US21/62010 dated Feb. 16, 2022, 9 pgs.

International Search Report and Written Opinion issued in PCT/US21/61970 dated Feb. 18, 2022, 17 pgs.

International Search Report and Written Opinion issued in PCT/US21/61925 dated Feb. 18, 2022, 9 pgs.

International Search Report and Written Opinion issued in PCT/US21/61646 dated Feb. 25, 2022, 9 pgs.

International Search Report and Written Opinion issued in PCT/US21/65664 dated Mar. 11, 2022, 9 pgs.

International Search Report and Written Opinion issued in PCT/US21/62001 dated Mar. 9, 2022, 9 pgs.

International Search Report and Written Opinion issued in PCT/US21/61926 dated Mar. 8, 2022, 9 pgs.

Notice of Acceptance issued in Australian Application No. 2620302919 dated Mar. 2, 2022, 4 pgs.

Notice of Acceptance issued in Australian Application No. 2020283140 dated Mar. 30, 2022, 4 pgs.

(56) References Cited

OTHER PUBLICATIONS

Notice of Allowance issued in Canadian Application No. 3,140,008 dated May 5, 2022, 1 pg.
Office Action issued in Australian Patent Application No. 2020283140, dated Mar. 18, 2022, 5 pgs.
Office Action issued in U.S. Appl. No. 17/543,200, dated Mar. 9, 2022, 8 pages.
Office Action issued in U.S. Appl. No. 17/542,461, dated Mar. 10, 2022, 18 pages.
Office Action issued in U.S. Appl. No. 17/542,872, dated Mar. 17, 2022, 21 pages.
Office Action issued in U.S. Appl. No. 17/566,020, dated Mar. 18, 2022, 20 pages.
Office Action issued in U.S. Appl. No. 17/541,036, dated Mar. 31, 2022, 22 pages.
Office Action issued in U.S. Appl. No. 17/543,152, dated Apr. 19, 2022, 17 pages.
Office Action issued in U.S. Appl. No. 17/542,814, dated Apr. 25, 2022, 21 pages.
Vermeersch, "Influence of substrate thickness on thermal impedance of microelectronic structures", Microelectronics Reliability, 47, 2007, pp. 437-443.
Office Action issued in U.S. Appl. No. 17/542,462, dated May 27, 2022, 28 pages.
Office Action issued in U.S. Appl. No. 17/542,461, dated Jun. 27, 2022, 13 pages.
Office Action issued in U.S. Appl. No. 17/566,020, dated Jul. 12, 2022, 20 pages.
Office Action issued in U.S. Appl. No. 17/543,200, dated Jul. 20, 2022, 25 pages.
Office Action issued in U.S. Appl. No. 17/746,622, dated Jul. 22, 2022, 19 pages.
Office Action issued in U.S. Appl. No. 17/541,036, dated Aug. 9, 2022, 22 pages.
Office Action issued in U.S. Appl. No. 17/746,640, dated Aug. 18, 2022, 19 pages.
Notice of Allowance issued in U.S. Appl. No. 17/542,872, dated Jul. 11, 2022, 13 pages.
Notice of Allowance issued in U.S. Appl. No. 17/543,152, dated Jul. 29, 2022, 16 pages.
U.S. Appl. No. 17/540,021, filed Dec. 1, 2021, Heim et al.
U.S. Appl. No. 17/541,036, filed Dec. 2, 2021, Heim et al.
U.S. Appl. No. 17/543,152, filed Dec. 6, 2021, Bivolarsky et al.
U.S. Appl. No. 17/542,814, filed Dec. 6, 2021, Burcham et al.
U.S. Appl. No. 17/542,461, filed Dec. 5, 2021, Burcham et al.
U.S. Appl. No. 17/542,872, filed Dec. 6, 2021, Bivolarsky et al.
U.S. Appl. No. 17/543,200, filed Dec. 6, 2021, Bivolarsky et al.
U.S. Appl. No. 17/542,462, filed Dec. 5, 2021, Bivolarsky et al.
U.S. Appl. No. 17/566,020, filed Dec. 30, 2021, Bivolarsky et al.
U.S. Appl. No. 17/746,622, filed May 17, 2022, Bivolarsky et al.
U.S. Appl. No. 17/746,640, filed May 17, 2022, Bivolarsky et al.
Office Action issued in U.S. Appl. No. 17/542,814, dated Aug. 26, 2022. 22 pages.
Office Action issued in U.S. Appl. No. 17/540,021, dated Sep. 15, 2022, 40 pages.
Notice of Allowance issued in U.S. Appl. No. 17/543,200, dated Nov. 3, 2022, 16 pages.

\* cited by examiner

APPARATUS, SYSTEM, AND METHOD FOR THE DETECTION OF OBJECTS AND ACTIVITY WITHIN A CONTAINER

CROSS REFERENCE TO RELATED APPLICATION

This application claims benefit of U.S. Provisional Application Ser. No. 63/122,336 entitled, "Apparatus, system, and method for the detection of contents and activity within a container" filed Dec. 7, 2020, and claims the benefit of U.S. Provisional Application Ser. No. 63/121,720 entitled, "Three-dimensional reconstruction of a sediment surface at the bottom of a tank" filed Dec. 4, 2020, the entire disclosures of which are incorporated herein by reference.

FIELD OF THE DISCLOSURE

The present disclosure is generally related to analysis of containers, and more particularly is related to detecting objects and activity within a container.

BACKGROUND OF THE DISCLOSURE

Containers such as conduits, pipes, hoses, smokestacks, and the like, are utilized for the transportation and transmission of fluids, which includes liquids, gases, plasmas, and similar materials. Other containers, such as vessels, tanks, and storage facilities may be used to hold fluids for periods of time. With containers used for either or both transportation and/or storage of fluids, it is often the case that particulate matter within the fluids can build up within the interior of the containers over time, which may result in damage to the container or damage downstream from a container. This particulate may collect on the inner surface of the container and build up obstructions to fluid transmission.

When an obstruction is suspected, or pressure buildup is detected, or performance is lagging, the container must go through a maintenance procedure, wherein it is often taken offline so it can be flushed out and cleaned. This can be an expensive and time consuming process due to the effort involved in accessing the interior of the containers and performing the cleaning procedures. Additionally, the time the container is offline commonly results in a loss of productivity and revenue for an entity operating the container.

In a more specific situation, it is common for industrial containers, and especially those used in the oil and gas industry, to have sludge form on the bottom of the container, often from sediment gravitationally settling to the bottom. For example, according to an investigation conducted by the Environmental Protection Agency (EPA), each refinery in the USA produces an annual average of 30,000 tons of oily sludge. It is estimated that, in 2001, large oil refineries (processing $(2-5) \times 10^5$ barrels per day) in the USA, produced 10,000 m³ of sludge and in India about 50,000 tons. Total production of sludge goes up because of the increasing demand for refined petroleum products worldwide.

The sediment on the bottom of a container in many industries has an uneven surface due to liquid flow over the sludge over a period of time. This uneven surface is characteristic for oil and gas industry as well as construction water processing. Within the oil industry specifically, the sediment at the bottom of the oil tanks mostly contains crystalized paraffin wax. The process of the sediment settling at the bottom of the tanks occurs naturally due to gravity and density of the sediment relative to the fluid in the tank. In one example, it is common for there to be several layers of sediment that build up on the bottom of the tank, and often, a layer of water forms on the top of the sediment. The crude oil is then located above the layer of water, and a layer of air is positioned above the crude oil. The sludge itself in crude oil tanks is typically made of up of water, petroleum hydrocarbons, and solids.

It is important to know the volume of the sediment at the bottom of the tank since this knowledge allows one to accurately estimate the crude oil in the tank and provides information on when to clean the bottom of the tank. For example, the sludge at the bottom of a crude oil tank can reach to 6-8 feet, which if not accounted for, can significantly affect an estimate of the volume of crude oil in a tank. In the construction industry, water from construction sites must be treated in a sedimentation tank before it can be sent to the outside of the construction site. This prevents solids like sand and grit from settling and blocking the flow. Accounting for the amount of sedimentation at the bottom of the tank allows for an accurate understanding of how much water can be processed through the tank and when the tank needs to be cleaned, among other aspects.

Thus, a heretofore unaddressed need exists in the industry to address the aforementioned deficiencies and inadequacies.

SUMMARY OF THE DISCLOSURE

Embodiments of the present disclosure provide an apparatus, system, and method for the detection of an object within a container. Briefly described, in architecture, one embodiment of the apparatus, among others, can be implemented as follows. A container has a quantity of fluid within an interior space thereof. At least one object is within the interior space of the container and in contact with the fluid. A plurality of acoustic sensors is mounted on an exterior surface of the container. A plurality of acoustic signals is transmitted into the container by at least a portion of the plurality of acoustic sensors, wherein each of the acoustic sensors is capable of transmitting the acoustic signals to a remainder of the plurality of acoustic sensors, and receiving acoustic signals from the remainder of the plurality of acoustic sensors concurrently. At least one echo of at least one of the acoustic signals is altered by the at least one object within the quantity of fluid, wherein each of the plurality of acoustic sensors is capable of receiving echoes. A computerized device has a processor and is in communication with each of the plurality of acoustic sensors, wherein the processor controls the transmission of acoustic signals and collects data representing the received signals and received echoes, wherein the object within the container is detected based on at least one of the received signals and the received echoes.

The present disclosure can also be viewed as providing methods of detecting an object within a container. In this regard, one embodiment of such a method, among others, can be broadly summarized by the following steps: providing a container having a quantity of fluid within an interior space thereof, wherein at least one object is within the interior space of the container and in contact with the fluid; mounting a plurality of acoustic sensors on an exterior surface of the container; transmitting a plurality of acoustic signals into the container by at least a portion of the plurality of acoustic sensors, wherein each of the acoustic sensors is capable of transmitting the acoustic signals to a remainder of the plurality of acoustic sensors, and receiving acoustic signals from the remainder of the plurality of acoustic sensors concurrently; contacting the at least one object with one or more of the plurality of transmitted acoustic signals, wherein the one or more of the plurality of transmitted acoustic signals is altered to generate at least one echo; receiving the at least one echo at one or more of the plurality of acoustic sensors; collecting data representing the transmitted acoustic signals and the received echoes with a computerized device having a processor, the computerized device in communication with each of the plurality of acoustic sensors; and detecting the object within the container based on at least one of the transmitted acoustic signals and the received echoes.

Embodiments of the present disclosure provide an apparatus, system, and method for analyzing a sediment surface within a tank. Briefly described, in architecture, one embodiment of the apparatus, among others, can be implemented as follows. The apparatus has at least two acoustic transducers. A first of the two acoustic transducers is positioned on a first side of the container, and a second of the two acoustic transducers is positioned on a second side of the container. At least one acoustic signal is angularly transmitted through a fluid material within the container by the first acoustic transducer, wherein the at least one acoustic signal reflects off a sediment surface and is received at the second acoustic transducer. A computerized device has a processor and is in communication with at least two acoustic transducers, wherein the processor analyzes the sediment surface based on the reflection of the at least one acoustic signal.

The present disclosure can also be viewed as providing methods for analyzing a sediment surface, or any other surface produced by different materials interfacing with each other within a container. In this regard, one embodiment of such a method, among others, can be broadly summarized by the following steps: providing at least two acoustic transducers, wherein a first of the two acoustic transducers is positioned on a first side of the container, and a second of the two acoustic transducers is positioned on a second side of the container; angularly transmitting at least one acoustic signal through a fluid material within the container by the first acoustic transducer; reflecting the at least one acoustic signal off a sediment surface; receiving the at least one acoustic signal at the second acoustic transducer; and analyzing, with a computerized device having a processor in communication with at least two acoustic transducers, the at least one acoustic signal reflected off the sediment surface.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

To improve upon the shortcomings discussed in the Background, it is desirable to be able to detect both the content of particulate matter within the fluid in a container, and the buildup of particulate matter within the container, as well as any static or dynamic surfaces or objects. Being able to detect this particulate matter or surfaces allows for early detection of issues and pinpointed maintenance to be performed on the container when it is needed, rather than at predetermined intervals of time. Performing maintenance and cleaning only when necessary can help limit the downtime of the container, thus saving costs. For the accumulation of sludge within petroleum containers, being able to track and identify the sludge buildup can allow operators to know the volume of the container, such that they will be better prepared to prevent an overfill or underfill situation. Additionally, this same technique can be used to identify any other internal surface or object within a container.

Figure 1:
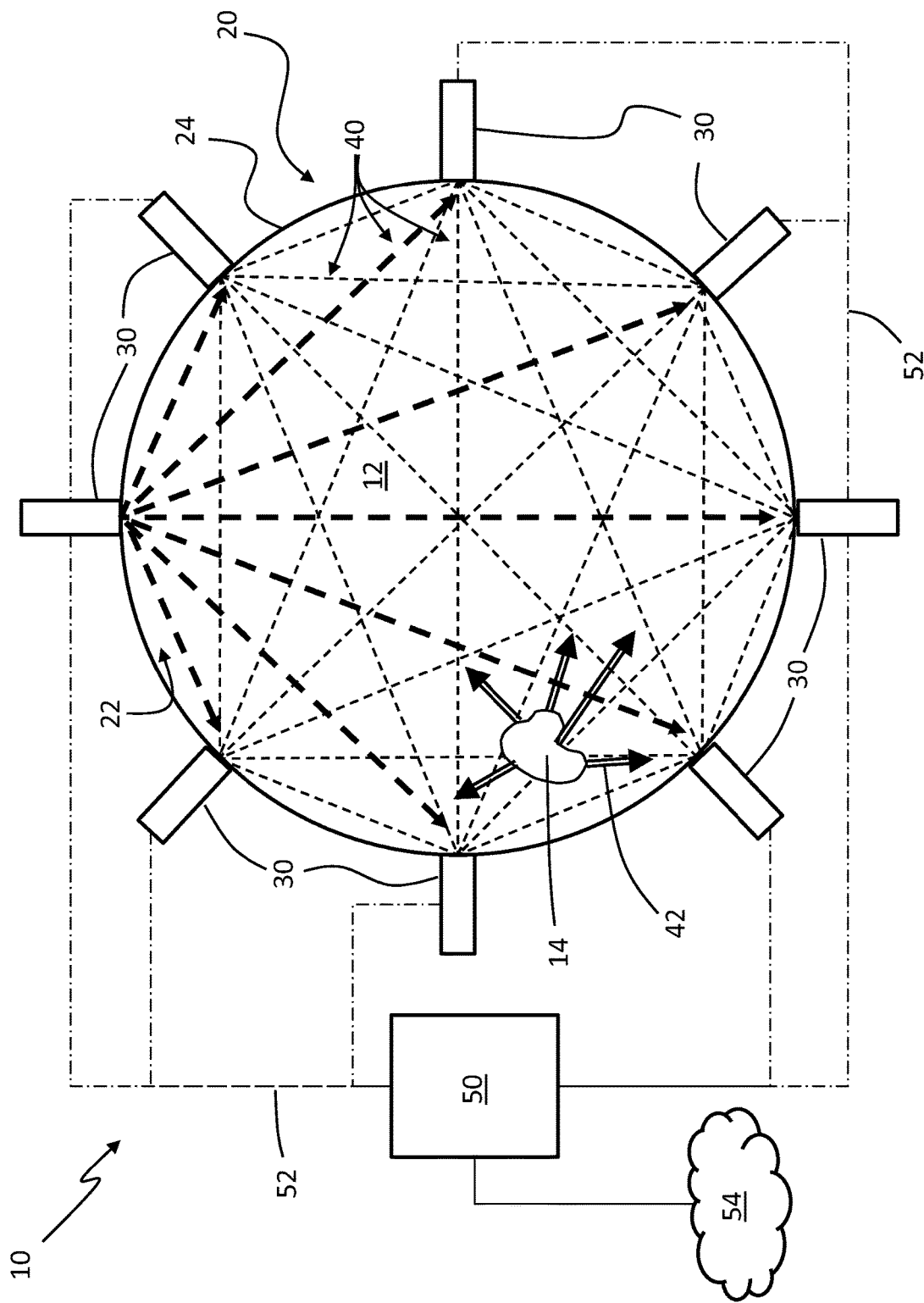
FIG. 1 is an illustration of a cross-sectional view of a system for the detection of an object within a container, in accordance with a first exemplary embodiment of the present disclosure.

FIG. 1 is an illustration of a cross-sectional view of a system for the detection of contents within a container 10, in accordance with a first exemplary embodiment of the present disclosure. The system for the detection of contents and activity within a container 10, which may be referred to herein simply as 'system 10', includes a container 20 having a quantity of fluid 12 within an interior space 22 thereof. At least one object 14 is positioned within the interior space 22 of the container 20 and is in contact with the fluid 12. A plurality of acoustic transducers 30 is mounted on an exterior surface 24 of the container 20. A plurality of acoustic signals 40 is transmitted into the container 20 by at least a portion of the plurality of acoustic transducers 30, wherein each of the acoustic transducers 30 is capable of transmitting the acoustic signals 40 to a remainder of the plurality of acoustic transducers 30, and receiving acoustic signals 40 from the remainder of the plurality of acoustic transducers 30 concurrently. At least one echo 42 of at least one of the acoustic signals 40 is altered by the at least one object within the quantity of fluid 12, wherein each of the plurality of acoustic transducers 30 is capable of receiving echoes 42. A computerized device 50 has a processor and is in communication with each of the plurality of acoustic transducers 30. The processor controls the transmission of acoustic signals 40 and collects data representing the received signals and received echoes 42. The object 14 within the container 20 is detected based on at least one of the received signals and the received echoes 42.

As illustrated in FIG. 1, the container 20 may be a pipe or cylindrical conduit, such as would be seen in a pipeline, but in other examples, the container may include any type of fluid holding or transporting structure. The plurality of acoustic transducers 30 may be positioned on the exterior surface 24 of the container 20 either directly or indirectly, such that they are positioned along the outer surface of the container 20. When activated, the plurality of acoustic transducers 30 transmit one or more signals 40 into the interior 22 of the container 20, such that the signals 40 pass through the sidewall of the container 20 and enter the fluid 12 within the container 20. The signals 40 are used to create a visualization of the inner space of the container 20, and in particular, any objects 14 that may be located within the container 20. It is noted that the signals 40 depicted in FIG. 1 are diagrammatically representative and may not have the same signal pattern as depicted. Additionally, as the signals 40 from the acoustic transducers 30 are acoustic signals or ultrasound waves, they are not visually detectable.

The acoustic transducers 30 may be any form of acoustic sensor which is capable of emitting and/or receiving acoustic signals. In FIG. 1, the acoustic transducers 30 are illustrated diagrammatically positioned on the container 20 in a spaced arrangement about the circumference of the container 20, but it is possible for the acoustic transducers 30 to be used in arrays or other groupings in various positions about the container 30. Additionally, it is possible that the acoustic transducers 30 are rotatable or otherwise movable relative to the container 20, such that they have the ability to emit focused signals 40 in various directions.

The acoustic signals 40 penetrate the container 20 wall and are received through the wall of the container 20. Sending the acoustic signals 40 through neighboring acoustic transducers 30, as illustrated in FIG. 1, may facilitate identifying objects 14 within the container 20, and in particular, with identifying sediment buildup, more effectively than a signal 40 along a diameter of the container 20.

While the system 10 may be used in a variety of industries with various containers 20 holding different materials, in one example the system 10 is used within the petroleum industry. More specifically, the container 20 may be a petroleum pipeline or petroleum tank and the sediment or precipitate buildup may be paraffin wax, which is naturally occurring within oil, gas, and other petroleum products. For the oil and gas industry, the system 10 may be used in large tanks, as well as in pipelines to detect paraffin wax precipitation close to the wall, such that these precipitations of paraffin wax are not left unnoticed and cause flow obstructions or slowdowns. This information will prevent pipeline shut down for maintenance, which is usually a very expensive and time consuming process.

All receiving acoustic transducers 30 are connected to the computerized device 50, which may be a hub or controller with electronic processing capabilities which allow it to evaluate any parameter of the signals 40. The connection between the acoustic transducers 30 and the computerized device 50 may include any type of communication network 52 or network connection. The computerized device 50 and communication network 52 within FIG. 1 may have various features, designs, or architectures. For example, the communication network 52 may include any suitable network systems, including wired data connections and wireless data connections, e.g., LAN, intranet, Internet, Wi-Fi®, Bluetooth®, NFC, radio, or any other type of network connection. The computing device 50 may include any type and number of processors, including stationary processors, mobile processors, mobile devices, processor arrays, cloud processing networks, and the like. The computing device 50 may include any components required for operation, including a power source, computer-readable memory, network communications, and the like. The computerized device 50 may also be connected to a cloud computer network 54, such as the Internet or another network, whereby users of the system 10 can access data from the system 10 through various interfaces and platforms.

In one example of operation of the system 10, one or more acoustic transducers 30 emits one or more acoustic signals 40 into the container 20. Then, another acoustic transducer 30 sends a signal 40 to all other acoustic transducers 30. This process creates an array of acoustic transducers 30 of a variable number and configuration. While the acoustic transducers 30 in FIG. 1 are illustrated in a regularly spaced, planar, circular pattern, the array could be arranged in spiral pattern as well as in a linear pattern along a length of the container 20, or any other order or pattern of placing the acoustic transducers 30. All array configurations are considered to be within the scope of this disclosure. Multiple arrays of sensors can be used for evaluating the parameters of the signals over a period of time in a three-dimensional space.

The signal 40 sent from a first acoustic transducer 30 to all other acoustic transducers 30 can be received directly without any additional echoes. If there are N number of acoustic transducers 30, in any moment, one acoustic transducer 30 can be sent N−1 signals 40, which will be received by the N−1 other acoustic transducers 30 and then transmitted to the computerized device 50. If there are no objects 14 floating through the liquid, no further signals 40 may be received. Any additional signals 40, in the form of echoes 42 indicates the presence of an object 14 within the fluid 12 that has reflected a portion of a signal 40. Through triangulation, the computerized device 50 can determine where the object 14 is located within the container 20. For example, the location of the object 14 can be inside the cross section of the container or pipeline where the acoustic transducers 30 are located, or it can be determined to be a distance from the acoustic transducers 30. Additionally, one acoustic transducer 30 can send one signal that can be received by any number of other transducers at any moment of time and then repeated in any time pattern, thereby generating echoes which are regular, random, or based on the processing of previous echoes or reflections from the computerized device 50.

Figure 2:
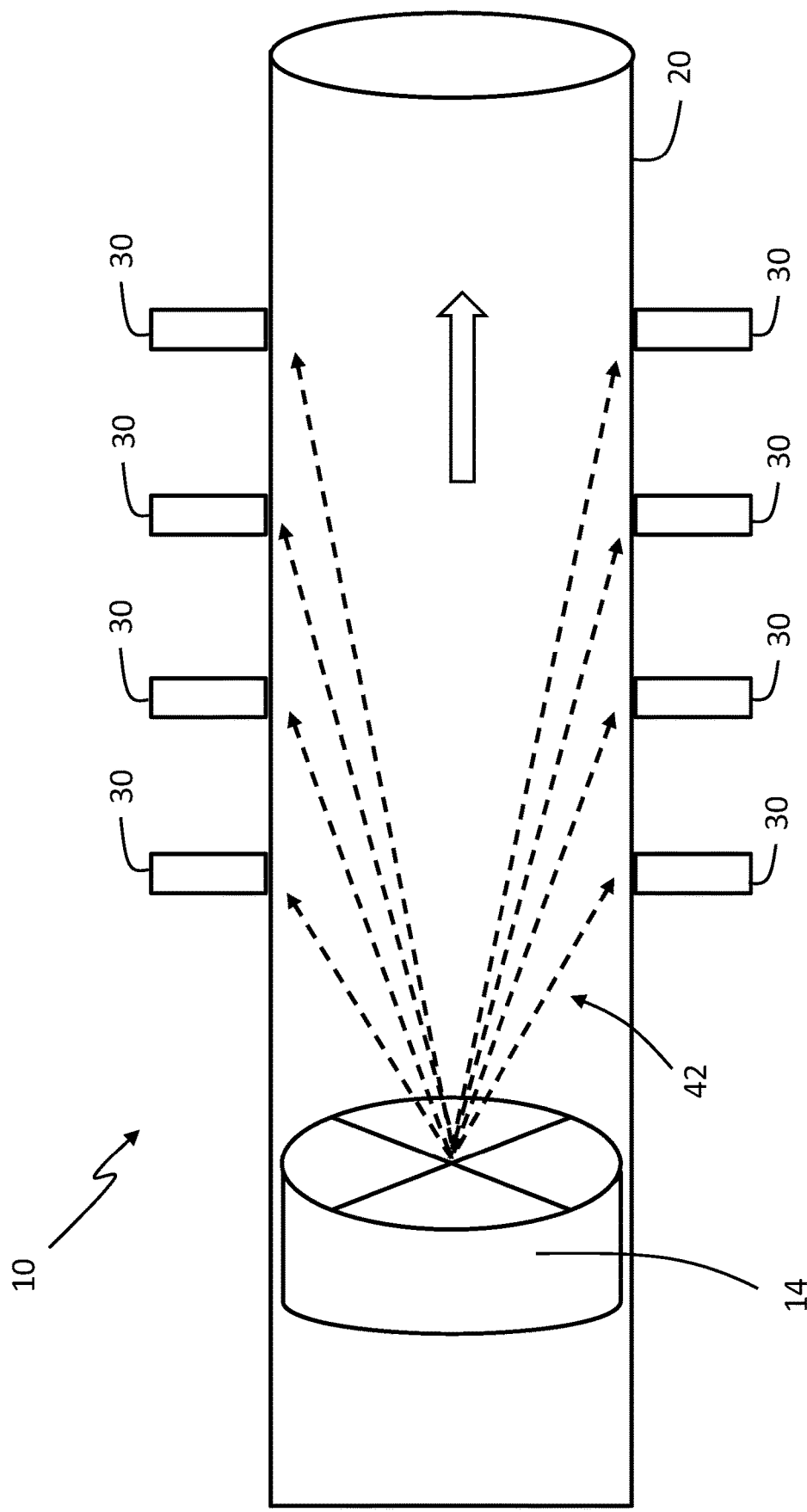
FIG. 2 is an illustration of a cross-sectional side view of the system for the detection of an object within a container illustrated in FIG. 1, in accordance with the first exemplary embodiment of the present disclosure.

FIG. 2 is an illustration of a cross-sectional side view of the system 10 for the detection of contents within a container 20 illustrated in FIG. 1, in accordance with the first exemplary embodiment of the present disclosure. In particular, FIG. 2 illustrates a linear arrangement of acoustic transducers 30 on opposing sides of the container 20, such as on the top and bottom of a pipeline, or on the left and right sides of a pipeline, although many other configurations may achieve a similar result. A signal 40 transmitted into the container 20 will reflect from the object 14, which may be moving or rotating in any possible direction. When the signal 40 contacts the object 14, the signal is reflected as an echo 42. The echo 42 will be received by one or more of the acoustic transducers 30, but may commonly be received by several of the plurality of acoustic transducers 30. By analyzing the echo 42 and the time of flight delay of the signal 40 or echo 42, the location and the shape of the object 14 can be determined. Additionally, a speed of the object 14 moving within the container 20 can be determined by evaluating the Doppler Effect of the response or other methods, such as by taking measurements over a period of time and tracking the object using its three-dimensional signature or form, and the characteristic of the movement of the object, such as it's translation movement (linear movement without rotation) and rotation movement.

In FIG. 2, the object 14 is diagrammatically represented as an automated cleaning machine which moves through the container 20 to remove unwanted deposits of buildup and particulate. As such, the object 14 represents a macro object that is passing through the container 20 to clean the container 20 from the inside using one or more mechanical components which contacts the interior surface of the sidewall of the container 20 to remove the particulate. These mechanical components which scrape and guide the automated cleaning machine generate characteristic noise that exhibits a frequency shift over time. This frequency shift can be processed by the system 10 and used to determine the speed of the automated cleaning machine and whether it is dissipating, thus indicating a successful cleaning of the container 20 or indicating the presence or absence of the automated cleaning machine.

In another example, the object 14 may include a plurality of small particulate which moves or floats through the container 20. For instance, with petroleum containers, the objects 14 may be asphaltene particles that encapsulate crystallized paraffin wax. This happens in the "cloud phase" of paraffin wax precipitation and can be detected. Both the size and the concentration of these particles can be ascertained using the system 10 since the smaller particles would reflect the acoustic signals 40 or sound waves differently, as identified through variations in frequencies and/or wavelengths. Additionally, the polycrystalline structure of the paraffin wax is susceptible to reflecting the acoustic signals 40 and in the initial phases of crystallization it would reflect additional echoes 42 by scattering the signal 40.

Each of the acoustic transducers 30 is also capable of receiving echoes 42 of the signals 40 created by the objects, such as particulate matter. The computerized device 50 (not illustrated in FIG. 2) is in communication with each of the acoustic transducers 30 and controls the transmission of signals 40 and collects data representing the received signals. The computerized device 50 can differentiate the signals 40 received from the echoes 42 and analyze the different wavelengths and frequencies of the echoes 42 as well as the location of the acoustic transducer 30 that received each echo 42 to identify the speed and location of each of the objects 14.

Figure 3:
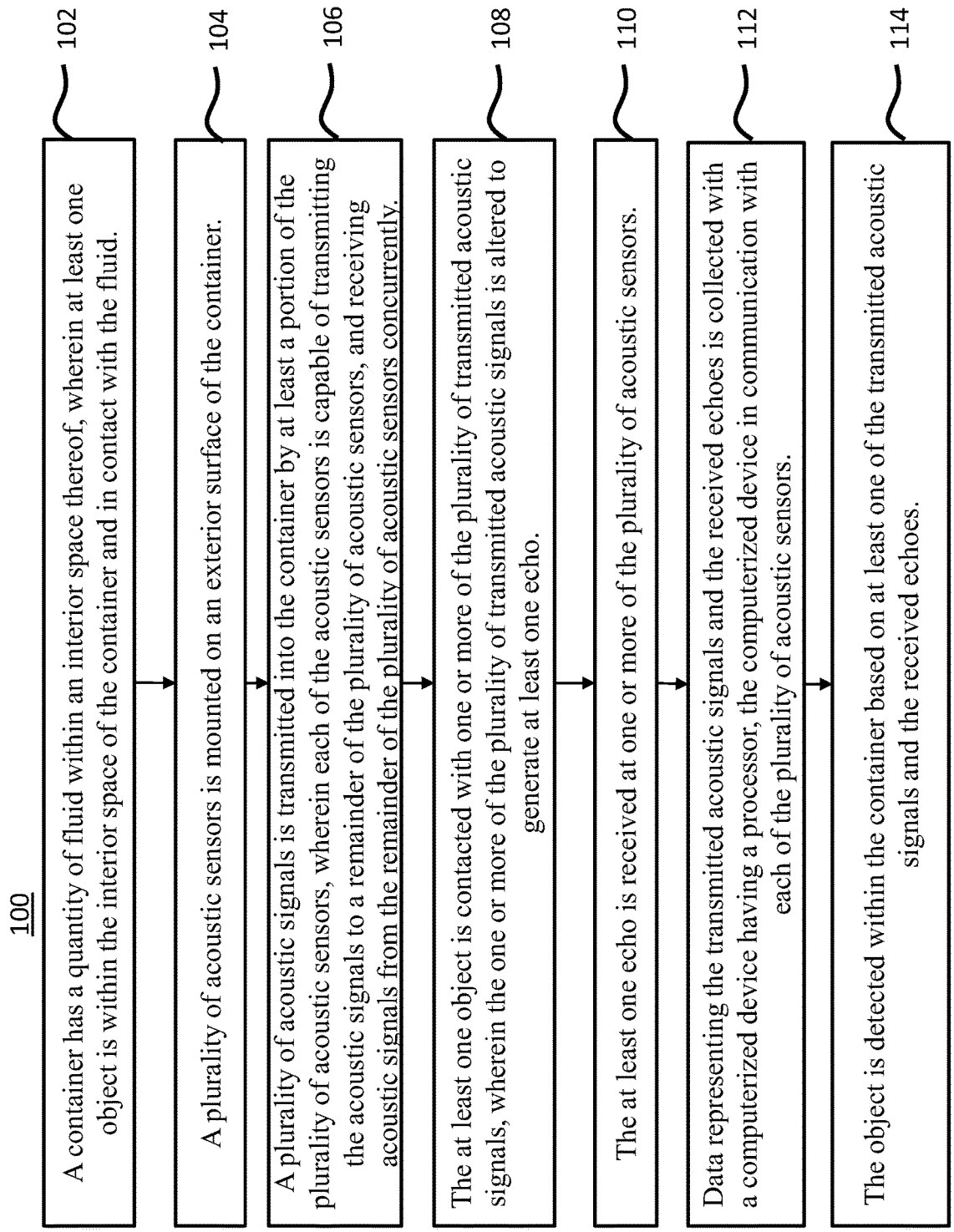
FIG. 3 is a flowchart illustrating a method of detecting an object within a container, in accordance with the first exemplary embodiment of the present disclosure.

FIG. 3 is a flowchart 100 illustrating a method of detecting an object within a container, in accordance with a third exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As shown at block 102, a container has a quantity of fluid within an interior space thereof, wherein at least one object is within the interior space of the container and in contact with the fluid. A plurality of acoustic sensors is mounted on an exterior surface of the container (block 104). A plurality of acoustic signals is transmitted into the container by at least a portion of the plurality of acoustic sensors, wherein each of the acoustic sensors is capable of transmitting the acoustic signals to a remainder of the plurality of acoustic sensors, and receiving acoustic signals from the remainder of the plurality of acoustic sensors concurrently (block 106). The at least one object is contacted with one or more of the plurality of transmitted acoustic signals, wherein the one or more of the plurality of transmitted acoustic signals is altered to generate at least one echo (block 108). The at least one echo is received at one or more of the plurality of acoustic sensors (block 110). Data representing the transmitted acoustic signals and the received echoes is collected with a computerized device having a processor, the computerized device in communication with each of the plurality of acoustic sensors (block 112). The object is detected within the container based on at least one of the transmitted acoustic signals and the received echoes (block 114). Any number of additional steps, functions, processes, or variants thereof may be included in the method, including any disclosed relative to any other figure of this disclosure.

As noted previously, the detection of objects 14 within a container 20 may be used to identify various parameters of the object 14, such as its size, movement, velocity, etc., as described relative to FIGS. 1-3. In addition to identifying parameters of the object 14 itself, it may be possible to detect characteristics of the container 20 or other aspects of fluid storage arrangement based on the detection of the object 14. This use of the present disclosure is described relative to FIGS. 4-7.

Figure 4:
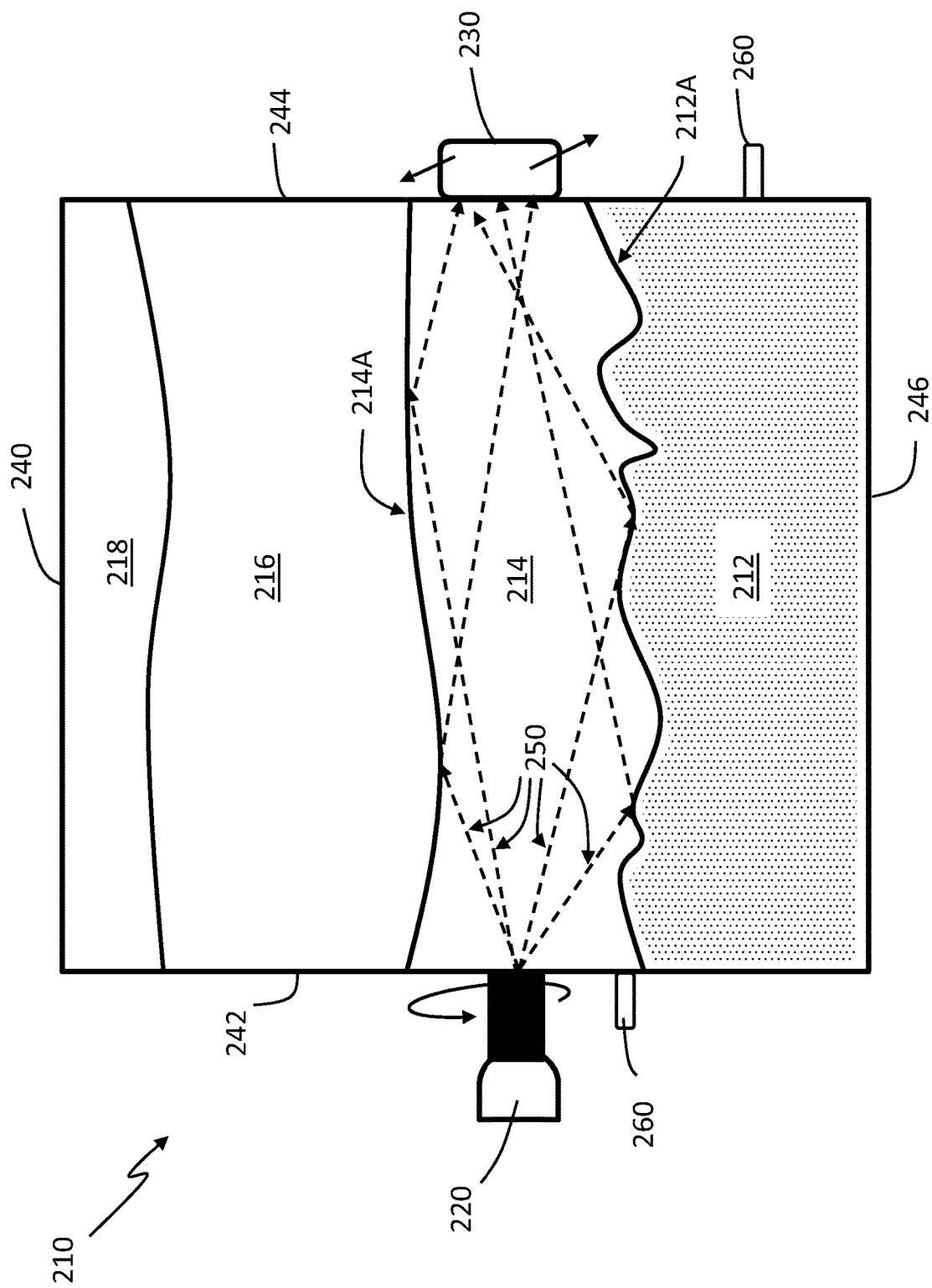
FIG. 4 is a diagrammatical illustration of an apparatus for analyzing a sediment surface within a container, in accordance with a second exemplary embodiment of the present disclosure.

FIG. 4 is a diagrammatical illustration of an apparatus for analyzing a sediment surface within a container 210, in accordance with a second exemplary embodiment of the present disclosure. The apparatus for analyzing a sediment surface within a container 210, which may be referred to simply as 'apparatus 210' includes at least two acoustic transducers 220, 230. A first of the two acoustic transducers 220 is positioned on a first side 242 of a container 240. A second acoustic transducer 230 is positioned on a second side 244 of the container 240. Contained within the container 240 are various fluids, including liquids or gasses, and/or solid or semi-solid substances. The sides 242, 244 of the container 240 on which the acoustic transducers 220, 230 are positioned are commonly the vertical sidewalls of the container 240, such that the acoustic transducers 220, 230 can be positioned along a side of the layered materials within the container 240.

To provide clarity in disclosure, the apparatus 210 is described relative to use with crude oil, in which case, as shown in FIG. 4, the container 240 includes a sediment layer 212 which may be formed from sludge or other particulate which has gravitationally settled on the bottom surface 246 of the container 240. The sediment layer 212 has a sediment surface 212A, above which is located a layer of water 214. Above the layer of water is the layer of crude oil 216 within the container 240, above which is a layer of air 218. It is noted that the proportions of the various layers within the container 240 depicted in FIG. 4 are not necessarily representative of actual proportions, and that the relative sizes of the various layers of materials within the container 240 will vary based on a number of parameters.

With the two acoustic sensors 220, 230 positioned on the sides 242, 244 of the container 240, at least one acoustic signal 250 (depicted in broken lines) is angularly transmitted by the first acoustic transducer 220 through a fluid material within the container 240. In the case of FIG. 4, the fluid material is the layer of water 214 positioned between the sediment 212 and the crude oil 216. The acoustic signal 250, transmitted in an angular direction, moves along a path in which the wave contacts the upper or lower surface of the water layer 214, such that the acoustic signal 250 reflects off the sediment surface 212A and/or the boundary layer 214A between the water layer 214 and the crude oil layer 216. The reflected signal is then received at the second acoustic transducer 230, which may be movable tangentially to the outer surface of the container 10 and/or may be able to change its angle towards the container 10 surface, as indicated by arrows in FIG. 4. By use of the reflected signal 250, and commonly a plurality of reflected signals 250 produced over a period of time, the apparatus 210 can be used to determine various criteria and characteristics about the sediment layer 212 on the bottom of the container 240.

In one example, the first transducer 220 is a rotating transducer which is capable of rotating about an axis positioned substantially perpendicular to the sidewall of the container 240. For a container 240 that is cylindrical, the axis of the first acoustic transducer 220 may traverse substantially through a center point of the container 240. The direction of the acoustic signal transmitted may be off-center, such that it is angularly directed towards a sediment surface 212A or the water surface 214A within the container 240, as opposed to directly across the container 240 without contacting a sediment or water surface 212A, 214A. As the first transducer 220 rotates about this axis, the transmitted acoustic signal 250 will have a directional movement which correlates to the position of the transducer 220 as it rotates, which allows a plurality of acoustic signals 250 to be transmitted to a large number of points along the sediment surface 212A and the water surface 214A. This rotation of the first transducer 220 along with continuous, near continuous, or periodic signal transmission allows for the acoustic signals 250 to be sent at various angles into the container 240, thereby allowing them to scan a large portion of the surface 212A of the sediment 212 on the bottom of the container 240.

The receipt of these signals allows for an effective three-dimensional (3D) reconstruction of the surface 212A of the sediment 212, which can be then used to provide additional information about the sediment 212 or the container 240. For instance, the 3D reconstruction of the sediment surface 212A can be used to calculate the exact or near exact surface features of the sediment 212. It can also be used, in combination with other parameters and information about the container 240, the materials within the container 240, or related information, to provide the volume, position, or weight of the sediment 212. In turn, this information can be used to determine the exact or near exact volume, weight, or position of the water 214 or crude oil 216 within the container 240.

One of the parameters which may be used to provide this information is the temperature of the materials within the container 240. The temperature may be measured using separate process or with one or a plurality of thermometers 260 positioned on the outside, inside, or sidewall of the container 240. Information from thermometers 260 can be used to interpolate the temperature of the materials within the container 240 over a period of time. Another parameter which may be measured for accurate analysis of the sediment 212 is any flow of materials within the container 240, such as movement of materials due to inlet or outlet pipes. Additionally, for crude oil containers, the level of oil in the container 240 can be used for predicting how much sediment 212 is still in the crude oil 216, if the volume, the density, and the composition of the crude oil 216 is known.

Measurements with the apparatus 210 may be performed periodically, such as hourly, daily, weekly, or along another time period, since the amount of sediment 212 within the container 240 is prone to changing over time. While the exact makeup of the sediment 212 within the container 240 will vary depending on the materials stored in the container 240, for a crude oil container, the sediment 212 typically includes water, solids, and hydrocarbons. The sediment 212 settles over a period of time to form the sediment layer on the bottom of the container 240. The process of sediment accrual may also depend on the composition of the crude oil, the temperature, the amount of water and sediments, as well as the mechanical flow of the fluid inside the container 240.

Additionally, it is noted that knowing the size of the container 240 can assist the analysis of the sediment 212. Specifically, knowing the size of the container 240 can help with evaluating the potential acoustic signal path of the waves. From the time of flight in a pitch-catch scenario, with the signal 250 transmitted from one transducer 220 and received by the other transducer 230, it is possible to estimate the number of bounces and legs that the signal 250 has taken and the reflections from both the surface of the sediment 212A and the water surface 214A. Moreover, knowing the temperature of the water 214 and absorption parameters, it is possible to estimate how many reflections of the signal 250 are from the sediment surface 212A and/or from the water surface 214A abutting the crude oil layer 216.

It is further noted that for situations where a container 240 is recently filled with materials, or where the materials experience mixing or similar action, there may not be discernable layers of the various materials. Rather, it can take time for the various materials to settle into the layers within the container 240. Accordingly, this initial phase of settling of the sediment 212 is in a form of emulsion that does not form a defined impedance barrier between the water 214 and the sediment 212. In this case, it is still possible to measure an increased density and viscosity of the non-separated materials in the container 240 with a shorter signal path. For instance, instead of determining the signal reflections against the material surfaces, it is possible to use transducers which are positioned a shorter distance from one another, such as non-radially positioned on a cylindrical container 240 versus transducers 220, 230 which are positioned on opposite sides of the container 240. The signal 250 in this case would not be sent through the center of the container 240, but rather, would traverse through a shorter path or chord from one location on the container's 240 sidewall to another location.

The apparatus 210 may also be used with a computerized device, which may include various computers, data processors, or similar electronic control devices which can receive the signal information along with other information about the container 240 and/or the materials within the container 240 and output information desired by the user. Computationally, the apparatus 210 may allow a user to evaluate all reflection, refraction, and absorption of the acoustic signals 250 inside the 3D space occupied by water 214 on the top of the sediment 212 within a container 240. Using the determined sediment surface 212A and the dimensions of the container 240, or similar information such as container 240 volume, it is possible to calculate or estimate the amount of sediment 212 within the container and/or the weight of the sediment 212 or other material within the container 240. In turn, this can be used to inform the user how much sediment 212 needs to be removed from a container 240, for example. Accordingly, this mapping of the surface 212A of the sediment 212 and calculating the sediment volume and weight can provide significant benefits to industries which are required to maintain containers.

It is also noted that while FIG. 4 depicts only two transducers 220, 230, it is possible and often desired to use a larger number of transducers on the container 240. For instance, 3, 4, 5, 6, 10, 20, or a greater number of transducers may be used, the specific number of which may be dependent on the size of the container 240, the materials within the container 240, and other considerations, such as the design of the apparatus 210.

Figure 6:
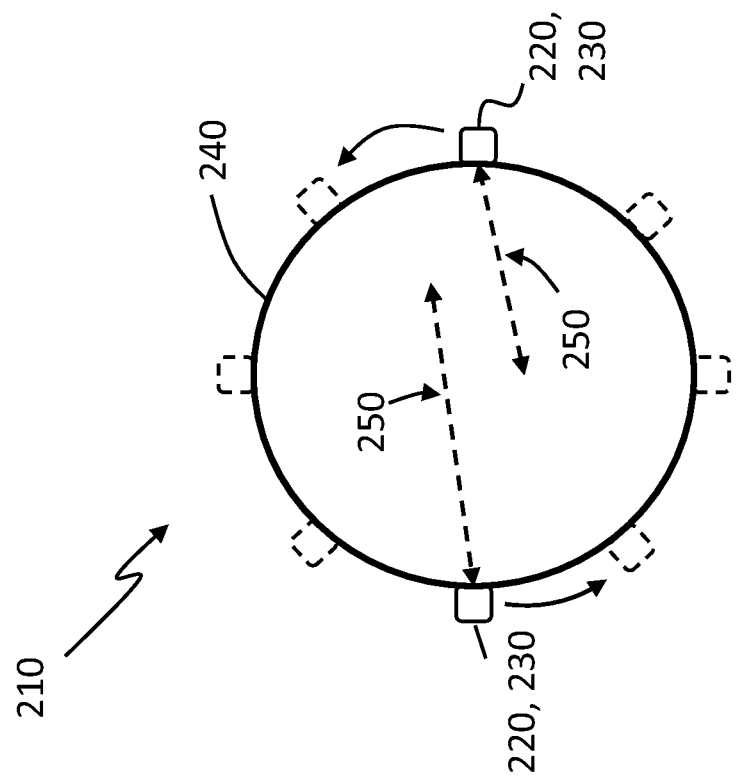
FIG. 6 is a diagrammatical top-view illustration of the apparatus for analyzing a sediment surface within a container of FIG. 4, in accordance with the second exemplary embodiment of the present disclosure.
Figure 5:
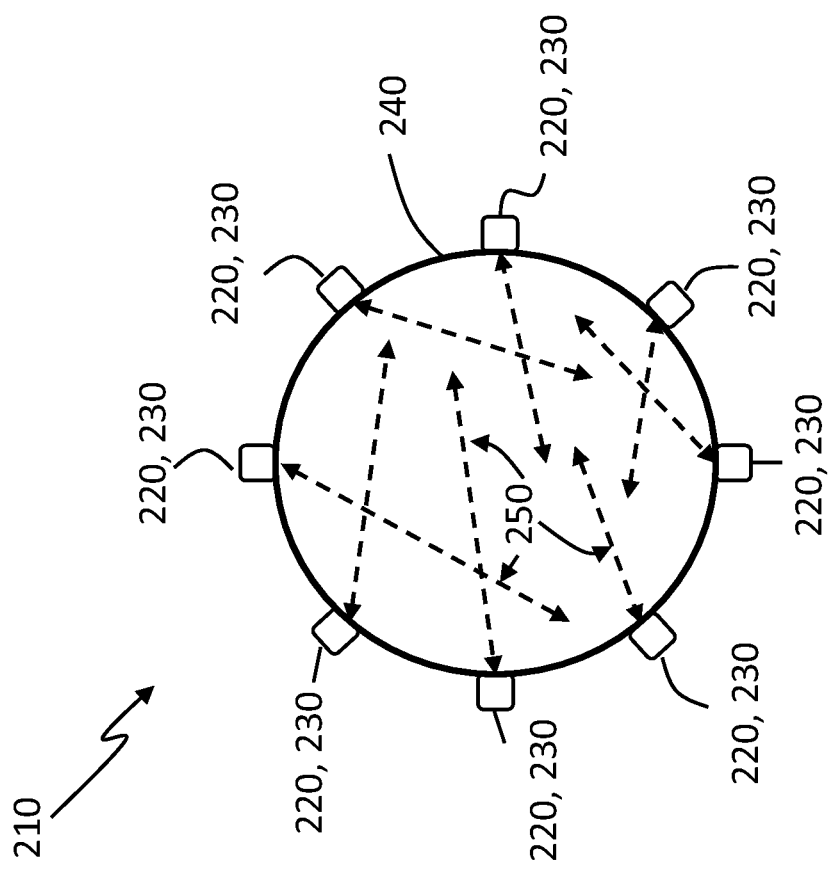
FIG. 5 is a diagrammatical top-view illustration of the apparatus for analyzing a sediment surface within a container of FIG. 4, in accordance with the second exemplary embodiment of the present disclosure.

FIG. 5 is a diagrammatical top-view illustration of the apparatus for analyzing a sediment surface within a container, in accordance with the first exemplary embodiment of the present disclosure, where more than two transducers 220, 230 are used on a container 240 to transmit signals 250 therein. Further, it may be desirable to use only two transducers 220, 230 in the apparatus 210 when both transducers are mobile or movable about the container 240, and when they are moved in synchronized pattern to characterize the surface 212A of the sediment 212. For example, FIG. 6 is a diagrammatical top-view illustration of the apparatus for analyzing a sediment surface within a container 210, in accordance with the first exemplary embodiment of the present disclosure, where two transducers 220, 230 are moved in a synchronous pattern about the sidewall of the container 240, transmitting signals 250 therein.

Figure 7:
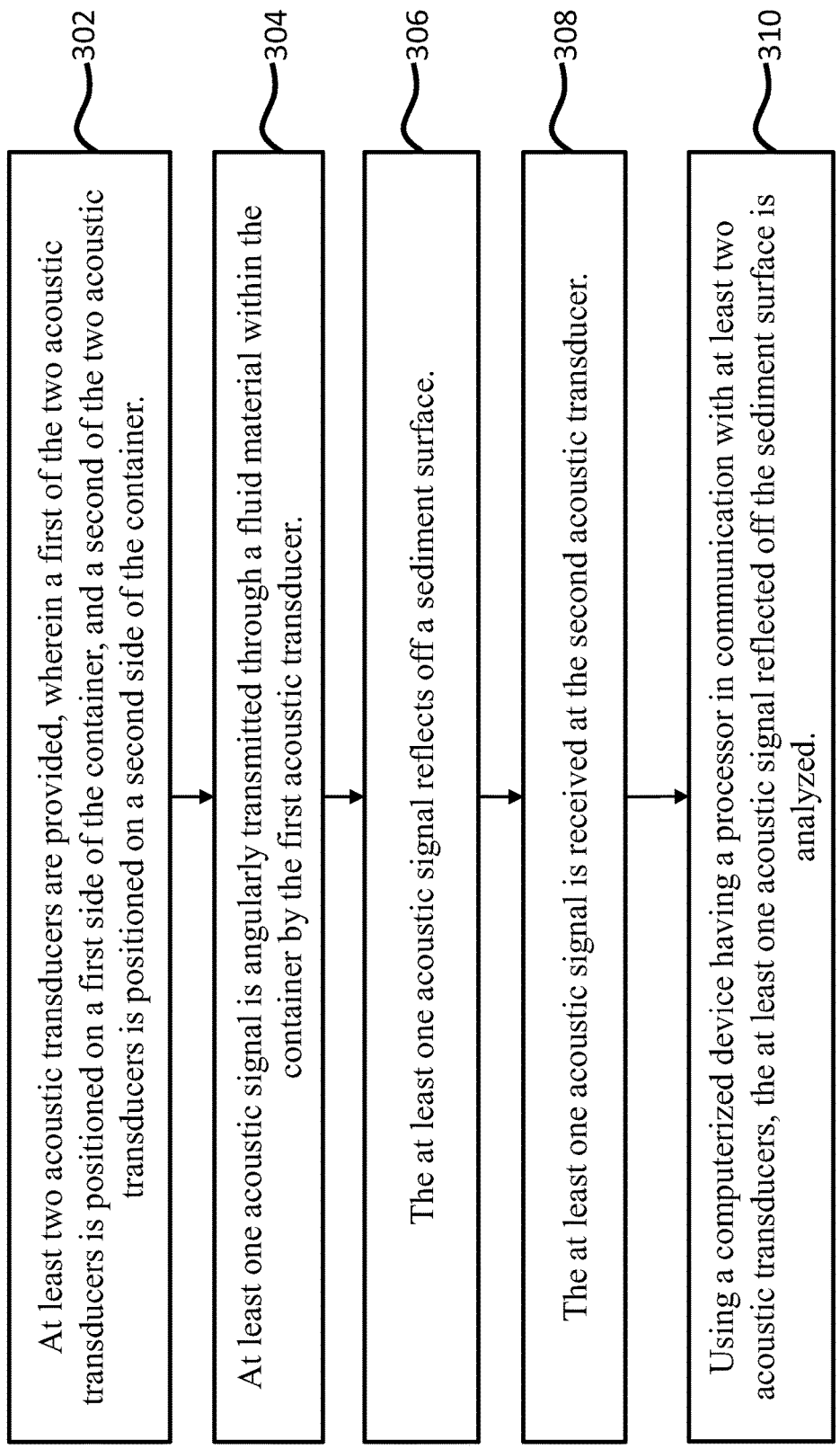
FIG. 7 is a flowchart illustrating a method for analyzing a sediment surface within a container, in accordance with the second exemplary embodiment of the disclosure.

FIG. 7 is a flowchart 300 illustrating a method for analyzing a sediment surface within a container, in accordance with the second exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

As is shown by block 302, at least two acoustic transducers are provided, wherein a first of the two acoustic transducers is positioned on a first side of the container, and a second of the two acoustic transducers is positioned on a second side of the container. At least one acoustic signal is angularly transmitted through a fluid material within the container by the first acoustic transducer (block 304). The at least one acoustic signal reflects off a sediment surface (block 306). The at least one acoustic signal is received at the second acoustic transducer (block 308). Using a computerized device having a processor in communication with at least two acoustic transducers, the at least one acoustic signal reflected off the sediment surface is analyzed (block 310). Any number of additional steps, functions, processes, or variants thereof may be included in the method, including any disclosed relative to any other figure of this disclosure.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A system for the detection of an object within a container, the system comprising:
    a container having a quantity of fluid within an interior space thereof;
    at least one object within the interior space of the container and in contact with the fluid;
    a plurality of acoustic sensors mounted on an exterior surface of the container;
    a plurality of acoustic signals transmitted into the container by at least a portion of the plurality of acoustic sensors, wherein each of the acoustic sensors transmits the acoustic signals to a remainder of the plurality of acoustic sensors, and receives the acoustic signals from the remainder of the plurality of acoustic sensors concurrently;
    at least one echo of at least one of the acoustic signals altered by the at least one object within the quantity of fluid, wherein each of the plurality of acoustic sensors is capable of receiving echoes; and
    a computerized device having a processor, the computerized device in communication with each of the plurality of acoustic sensors, wherein the processor controls the transmission of acoustic signals and collects data representing the received signals and received echoes, wherein the object within the container is detected based on at least one of the received signals and the received echoes.

2. The system of claim 1, wherein the at least one object is a buildup of precipitate on an interior surface of the container.

3. The system of claim 1, wherein the object within the container is detected based on a time of flight analysis and attenuation of the at least one of the received signals and the received echoes.

4. The system of claim 1, wherein a shape of the object detected within the container is determined.

5. The system of claim 4, wherein the shape of the object is determined by analyzing an echo level and a time of flight delay of at least one of the received signals and the received echoes.

6. The system of claim 1, wherein a position of the object detected within the container is detected using triangulation.

7. The system of claim 1, wherein a speed of movement of the object is detected within the container.

8. The system of claim 1, wherein the plurality of acoustic sensors is mounted on the exterior surface of the container in at least one of: a circular pattern around a circumference of the container; or a spiral pattern around the circumference of the container.

9. A method of detecting an object within a container, the method comprising:
    providing a container having a quantity of fluid within an interior space thereof, wherein at least one object is within the interior space of the container and in contact with the fluid;
    mounting a plurality of acoustic sensors on an exterior surface of the container;
    transmitting a plurality of acoustic signals into the container by at least a portion of the plurality of acoustic sensors, wherein each of the acoustic sensors transmits the acoustic signals to a remainder of the plurality of acoustic sensors, and receives the acoustic signals from the remainder of the plurality of acoustic sensors concurrently;

contacting the at least one object with one or more of the plurality of transmitted acoustic signals, wherein the one or more of the plurality of transmitted acoustic signals is altered to generate at least one echo;

receiving the at least one echo at one or more of the plurality of acoustic sensors;

collecting data representing the transmitted acoustic signals and the received echoes with a computerized device having a processor, the computerized device in communication with each of the plurality of acoustic sensors; and detecting the object within the container based on at least one of the transmitted acoustic signals and the received echoes.

10. The method of claim 9, wherein the at least one object is a buildup of precipitate on an interior surface of the container.

11. The method of claim 9, further comprising detecting the object within the container based on a time of flight analysis and attenuation of the at least one of the received signals and the received echoes.

12. The method of claim 9, further comprising determining a shape of the object detected within the container.

13. The method of claim 12, further comprising determining the shape of the object by analyzing an echo level and a time of flight delay of at least one of the received signals and the received echoes.

14. The method of claim 9, further comprising detecting a position of the object within the container using triangulation.

15. The method of claim 9, further comprising detecting a speed of movement of the object within the container.

16. An apparatus for analyzing a sediment surface within a container, the apparatus comprising:
 at least two acoustic transducers, wherein a first of the two acoustic transducers is positioned on a first side of the container, and a second of the two acoustic transducers is positioned on a second side of the container;
 at least one acoustic signal angularly transmitted through a fluid material within the container by the first acoustic transducer, wherein the at least one acoustic signal reflects off a sediment surface in contact with the fluid and is received at the second acoustic transducer; and
 a computerized device having a processor in communication with at least two acoustic transducers, wherein the processor analyzes the sediment surface based on the reflection of the at least one acoustic signal.

17. The apparatus of claim 16, wherein the processor determines at least one of a sediment volume or a sediment weight based on the reflection of the at least one acoustic signal.

18. The apparatus of claim 17, wherein a volume of remaining space within the container is determined based on the analysis of the sediment volume or the sediment weight.

19. The apparatus of claim 16, wherein at least one of the at least two acoustic transducers is rotatable, wherein a plurality of acoustic signals is transmitted at different points in time while rotating the at least one of the at least two acoustic transducers.

20. The apparatus of claim 16, wherein the at least two acoustic transducers are rotatable, wherein the at least two acoustic transducers are moved in a synchronized pattern.

* * * * *